United States Patent
Guilford et al.

(10) Patent No.: US 11,588,820 B2
(45) Date of Patent: Feb. 21, 2023

(54) CERTIFICATE BASED AUTOMATED NETWORK CONFIGURATION

(71) Applicant: International Business Machines Corporation, Armonk, NY (US)

(72) Inventors: Michael Guilford, Cary, NC (US); Ricardo Torres, Jr., Knightdale, NC (US); Karan Goenka, Cary, NC (US); Daniel James Anderson, Omaha, NE (US)

(73) Assignee: International Business Machines Corporation, Armonk, NY (US)

( * ) Notice: Subject to any disclaimer, the term of this patent is extended or adjusted under 35 U.S.C. 154(b) by 121 days.

(21) Appl. No.: 17/362,044

(22) Filed: Jun. 29, 2021

(65) Prior Publication Data
US 2022/0417035 A1    Dec. 29, 2022

(51) Int. Cl.
*H04L 29/06* (2006.01)
*H04L 9/40* (2022.01)
*H04L 9/32* (2006.01)

(52) U.S. Cl.
CPC ............ *H04L 63/10* (2013.01); *H04L 9/3268* (2013.01); *H04L 63/166* (2013.01)

(58) Field of Classification Search
CPC ...................................................... H04L 63/10
See application file for complete search history.

(56) References Cited

U.S. PATENT DOCUMENTS

| | | | | |
|---|---|---|---|---|
| 9,736,184 B2 * | 8/2017 | Kumar | .................... | H04L 63/02 |
| 2007/0143595 A1 | 6/2007 | Girard | | |
| 2017/0104749 A1 * | 4/2017 | Koster | ................ | H04W 12/069 |
| 2018/0205722 A1 * | 7/2018 | Getschmann | ....... | H04L 63/0876 |
| 2022/0201000 A1 * | 6/2022 | Kim | ...................... | H04W 12/37 |

OTHER PUBLICATIONS

"Comodo Dome Firewall Virtual Appliance—Quick Start Guide > Step 5—Configure Firewall Policy", Comodo, Downloaded from the Internet on May 20, 2021, 16 pgs , <https://help.comodo.com/topic-451-1-935-12753-.html>.
"Map Users to Groups", PAN-OS® Administrator's Guide, Updated on May 11, 2021, Downloaded from the Internet on May 20, 2021, 6 pgs.,<https://docs.paloaltonetworks.com/pan-os/10-0/pan-os-admin/user-id/map-users-to-groups.html>.
"Protocol Numbers", IANA, Internet Assigned Numbers Authority, Last Updated on Feb. 26, 2021, <https://www.iana.org/assignments/protocol-numbers/protocol-numbers.xhtml>.

(Continued)

*Primary Examiner* — Bradley W Holder
(74) *Attorney, Agent, or Firm* — David B. Woycechowsky

(57) ABSTRACT

Disclosed are techniques for determining network configurations through machine logic from security certificates of destination computer devices in the network. When a security component of a network receives an incoming data packet sent to a destination computer device in the network, a security certificate is requested from the destination computer device. The security component then configures a set of network rules for forwarding data packets to the destination computer device based on information in the security certificate of the destination computer device. Properties of the incoming data packet are compared to the set of network rules to determine whether to forward the incoming data packet to the destination computer.

18 Claims, 4 Drawing Sheets

(56) References Cited

OTHER PUBLICATIONS

"Public Key Certificate", Wikipedia, the Free Encyclopedia, Last updated on May 14, 2021, Downloaded from the Internet on May 20, 2021, 11 pgs.,<https://en.wikipedia.org/wiki/Public_key_certificate#/media/File: Client_and_Server_Certificate.png>.

"The Istio Service Mesh", Istio, Downloaded from the Internet on May 20, 2021, 7 pgs., © 2021 Istio Authors. Version Istio 1.10, <https://istio.io/latest/docs/concepts/what-is-istio/>.

Simpson, et al., "Certificate-based Isolation Policy Design Example", Windows Security Microsoft Docs, Aug. 17, 2017, 3 pgs., <https://docs.microsoft.com/en-us/windows/security/threat-protection/windows-firewall/certificate-based-isolation-policy-design-example>.

* cited by examiner

CERTIFICATE BASED AUTOMATED NETWORK CONFIGURATION

BACKGROUND

The present invention relates generally to the field of network security, and more particularly to automated configuration of network port(s) and whitelisted connections.

In the fields of telecommunications and computer networking, a network packet is a formatted unit of data carried by a packet-switched network. A packet comprises of control information and user data; the latter is also referred to as the payload. Control information typically includes data for delivering the payload (e.g., source and destination network addresses, error detection codes, or sequencing information). In most instances, control information is found in headers and trailers of packets.

In the field of cryptography, X.509 is a standard that defines the format of public key certificates. X.509 certificates are used in many commonly used Internet protocols, including Transport Layer Security/Secure Sockets Layer (commonly abbreviated to TLS/SSL), which is the basis for Hypertext Transfer Protocol Secure (or HTTPS), the secure protocol for browsing the internet. They are also sometimes used in offline applications, such as electronic signatures. An X.509 certificate includes a public key and an identity (such as a hostname, an organization, or an individual), and is either signed by a trusted certificate authority or self-signed. When a certificate is signed by a trusted certificate authority, or validated by other means, individuals holding that certificate can rely on the public key it includes to establish secure communications with another party/computer device, or to validate documents digitally signed with the corresponding private key.

Software-defined networking (SDN) technology describes an approach to network management which enables dynamic, programmatically efficient network configuration in order to improve network performance and monitoring, making it more similar to cloud computing than traditional network management. SDN is intended to address the fact that the static architecture of traditional networks is decentralized and complex while current networks require more flexibility and easy troubleshooting. SDN implementations attempt to centralize network intelligence in one network component by disassociating the forwarding process of network packets (data plane) from the routing process (control plane). The control plane typically consists of at least one controller, which is considered the brain of the SDN network where the whole intelligence is incorporated. However, the intelligent centralization does have its own drawbacks when it comes to scalability, security, and elasticity, which is the main issue of most SDN implementations.

SUMMARY

According to an aspect of the present invention, there is a method, computer program product and/or system that performs the following operations (not necessarily in the following order): (i) receiving an incoming unit of data originating from an originating computer device for communication over a computer network to a destination computer device, including at least one network destination; (ii) receiving a server network security certificate from the destination computer device, where the server network security certificate includes information indicative of allowed network connections; (iii) determining whether the incoming unit of data is approved for forwarding to the destination computer device based, at least in part, on the network allow list field and the at least one network destination of the incoming unit of data; and (iv) forwarding the incoming unit of data from the originating computer device to the destination computer device.

DETAILED DESCRIPTION

Figure 1:
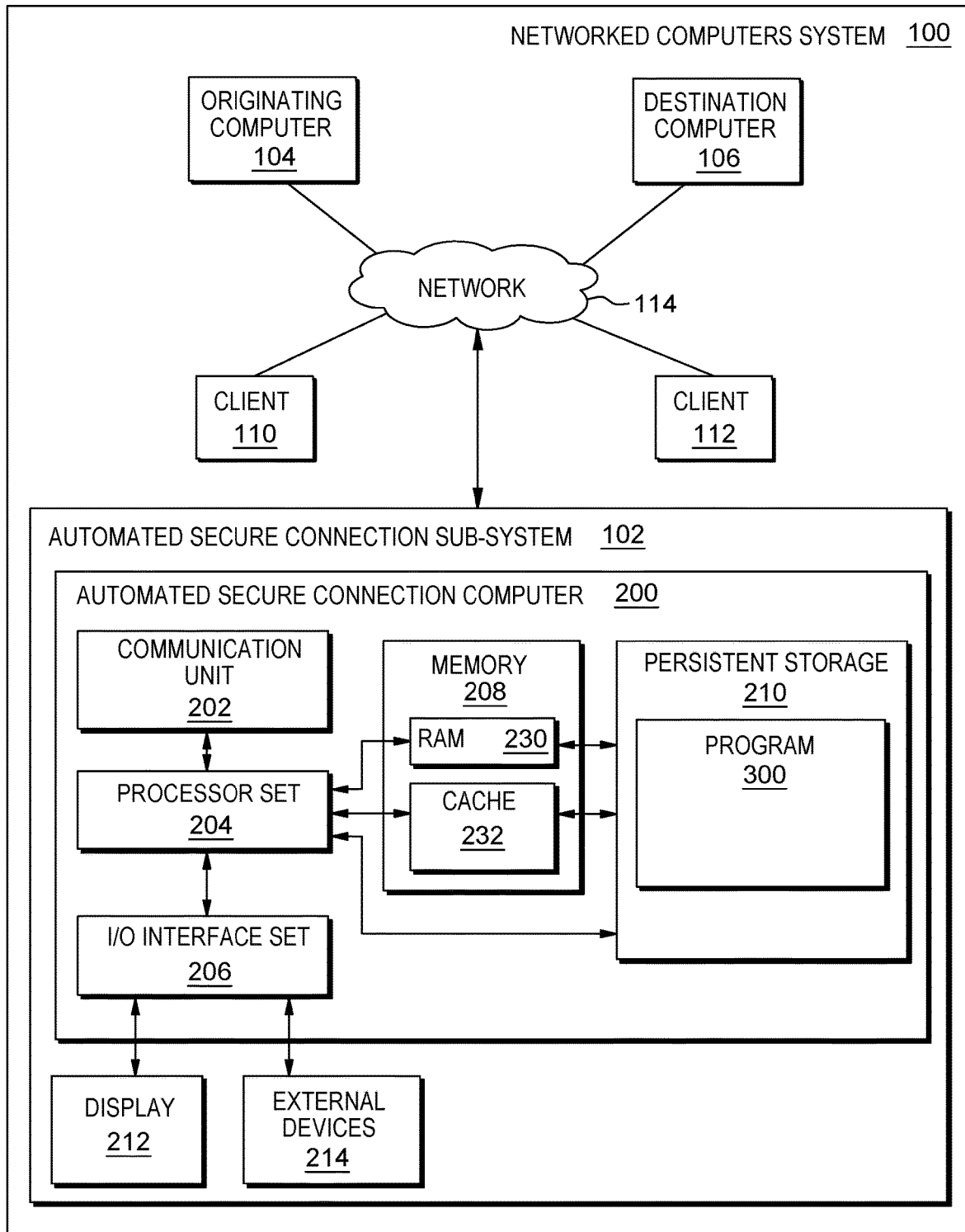
FIG. 1 is a block diagram view of a first embodiment of a system according to the present invention.

Some embodiments of the present invention are directed to techniques for determining network configurations through machine logic from security certificates of destination computer devices in the network. When a security component of a network receives an incoming data packet sent to a destination computer device in the network, a security certificate is requested from the destination computer device. The security component then configures a set of network rules for forwarding data packets to the destination computer device based on information in the security certificate of the destination computer device. Properties of the incoming data packet are compared to the set of network rules to determine whether to forward the incoming data packet to the destination computer.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium sometimes referred to as a machine readable storage device, can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be any thing made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: automated secure connection subsystem 102 (sometimes herein referred to, more simply, as subsystem 102); client subsystems 110, 112; and communication network 114. Automated secure connection subsystem 102 includes: automated secure connection computer 200; communication unit 202; processor set 204; input/output (I/O) interface set 206;

memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. In some embodiments of the present invention, physical communications and interfaces are not required, a software network interface would apply, for example in the form of a virtual firewall with virtual network cards, or a software based network switch with virtual network ports, or other software based system used to route and or transport network traffic between devices. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device(s) 214. External device(s) 214 will typically include devices such as a keyboard, keypad, a touch screen, and/or some other suitable input device. External device(s) 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen. In a virtual environment the input and output may be emulated devices.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

Originating computer 104 and destination computer 106 are server computers capable of hosting software applications for use by client computers (which in some instances are other server computers, such as originating computer 104 and destination computer 106, where one server computer hosts an application or service that is requested by the other server computer). Origin and destination could also be non client/server computers as long as the destination has a reachable address from the source and is able to respond with a valid certificate with the required allow list it could be other networks or other network devices such as routers, firewalls, switches, load balancers, IoT devices, or components of a service which have an IP address such as an application, an instance of an application, or PaaS instance, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
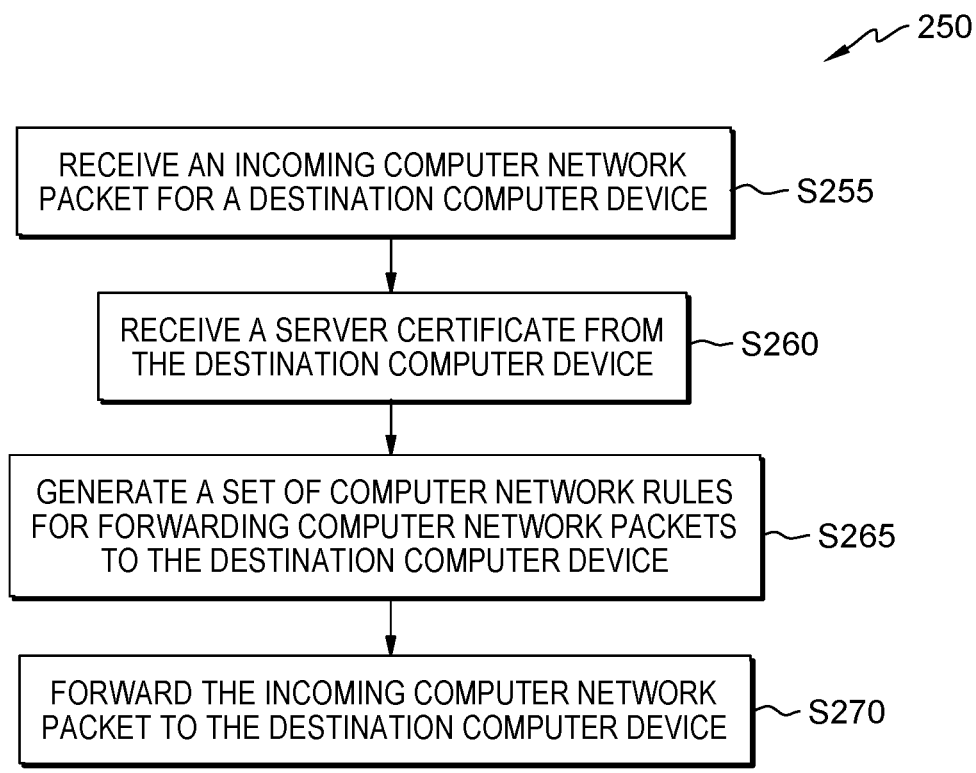
FIG. 2 is a flowchart showing a first embodiment method performed, at least in part, by the first embodiment system.
Figure 3:
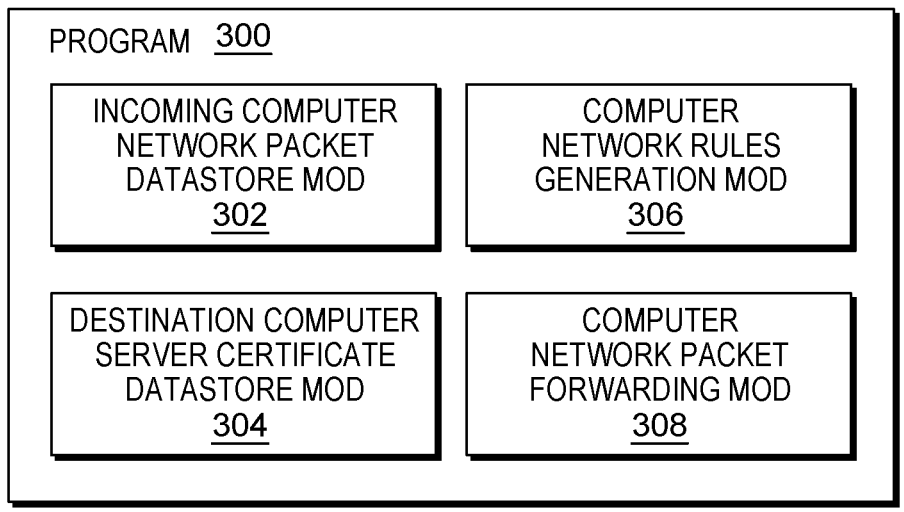
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or control performance of at least some of the method operations of flowchart 250. This method and associated software will now be discussed, over the course of the following paragraphs, with extensive reference to the blocks of FIGS. 1, 2 and 3.

Processing begins at operation S255, where incoming computer network packet datastore module ("mod") 302 receives an incoming computer network packet for a destination computer device. In this simplified embodiment, the incoming computer network packet (or "the packet") is received from originating computer 104 of FIG. 1, which is being sent to destination computer 106, the destination computer device. Both originating computer 104 and destination computer 106 are server computers, configured to send and receive computer readable data communicated over computer networks. The packet includes two parts: (i) a header; and (ii) a payload. In this simplified embodiment, the header of the packet includes the following information: (i) a source address with a value of "1.2.3.4", which is a simplified and shortened example internet protocol address; (ii) a network based protocol with a value corresponding to TCP; and (iii) a destination port with a value of "443". The payload includes a series of binary bits corresponding to the text "hello". The header and payload information are merely exemplary for illustrative purposes; other header and payload values may be used to carry out embodiments of the present invention, including other protocols than TLS and other types of information included in the header and payload.

Processing proceeds to operation S260, where destination computer server certificate datastore mod 304 receives a server certificate from the destination computer device. In this simplified embodiment, AUTOMATED SECURE CONNECTION SUB-SYSTEM 102 looks at the destination in the network transmission and then requests the certificate from the destination indicated in the packet, which is destination computer 106 of FIG. 1. Then, destination computer server certificate datastore mod 304 receives a server certificate from the destination computer 106. The server certificate, in this example embodiment, is an x509 certificate, which will be simplified for illustrative purposes to include only the following fields: (i) a common name for the entity, organization, or device that the certificate was issued to (or issued to common name); (ii) a fingerprint; and (iii) a network allow list field. The common name, in this example server certificate, is "destination computer". The fingerprint, again simplified for illustrative purposes, is "8D:CB". The network allow list, which is appended onto a typical x509 certificate, includes the following information: "Allow protocol TCP on destination port 443 from source address 1.2.3.4". When parsed out, the information in the network allow list can be broken down to include the following sub-fields and corresponding values: (i) protocol (TCP), describing the protocol for allowed connections; (ii) destination port (443), describing which port(s) on the destination computer (such as destination computer 106) will receive connections; and (iii) source address (1.2.3.4), describing the address(es) of computer(s) that are permitted to communicate with the destination computer (or destination computer 106). The TCP protocol indicated in the allow list is an example of one type of protocol that may be allowed (or disallowed) as indicated by the allow list. Other common protocols that may apply in some alternative embodiments of the present invention include, but are not limited to: (i) IP; (ii) IPv6; (iii) UDP; (iv) ICMP; and (v) any other such computer networking protocol used for communicating information between computer devices connected to a communication network.

In some alternative embodiments, the network allow list is a five-tuple (or 5-tuple) entry that includes a source IP address/port number, destination IP address/port number and the protocol in use. In some further alternative embodiments, instead of or in addition to a network allow list, a network block list is included in the server certificate, specifying which ports and/or addresses are to be blocked from communicating with the destination computer device. In yet further alternative embodiments, the network allow list field may include several sub-entries within each sub-field (for example, multiple destination ports, multiple source addresses, etc.). In another set of alternative embodiments, some sub-fields, such as source address, are optional and can be omitted from the network allow list field. In such instances, connections may be permitted from any valid source address instead of being limited to only the specified source address(es) in the network allow list field.

Processing proceeds to operation S265, where computer network rules generating mod 306 generates a set of computer network rules for forwarding computer network packets to the destination computer device. In this simplified embodiment, computer network rules generating mod 306 reads the network allow list field of the server certificate to retrieve information for generating one or more network rules that govern what internet traffic (such as the packet) reaches destination computer 106. Specifically, a network rule is generated based on the protocol, destination port, and source address of the server certificate. The network rule stipulates packets sent to destination computer 106 are forwarded to destination computer 106 only when they are: (i) using the TCP protocol; (ii) sent to destination port 443; and (iii) from source address 1.2.3.4. In some alternative embodiments, the rule generated at S265 is not the only rule applied for computer network traffic sent to destination computer 106; other rules stipulate other allowed communications with destination computer 106. For example, there may be another computer network rule that stipulates packets with an SSL protocol can be received on destination port 13 from any source address. Or another example computer network rule that stipulates packets with TLS protocols from source addresses 4.3.2.1. and 6.7.8.9. are allowed on ports 55 through 75.

Processing proceeds to operation S270, where computer network packet forwarding mod 308 forwards the incoming computer network packet to the destination computer device. In this simplified embodiment, when the packet meets the criteria stipulated in the generated set of computer networking rules, the packet is forwarded to the destination computer device, destination computer 106. If the packet fails to meet all the criteria of at least one computer networking rules applied to the destination computer device, it is not forwarded to the destination computer device (and essentially, is blocked).

In some alternative embodiments, when a new software application is hosted on a networked computer device, such as a server computer, a server certificate is included which includes at least one network allow list field, which when read by network security infrastructure, automatically results in configuring the network to allow certain computer network traffic and exclude others as appropriate for the application via a set of one or more networking rules. When a packet of data is first received by the network security infrastructure (such as a firewall), the network security infrastructure consults any networking rules to determine if the packet reaches or doesn't reach its destination. The computer network rules that are required for the application to operate, beyond (in some instances) the original certificate itself that is read by the network security infrastructure, are generated without further human input beyond the provisioning of the certificate itself: the network security infrastructure automatically generates rules to configure itself based upon the information in the network allow field.

III. Further Comments and/or Embodiments

Some embodiments of the present invention recognize the following facts, potential problems and/or potential areas for improvement with respect to the current state of the art: (i) network architectures are becoming more dynamic with the use of cloud technologies; (ii) with microservice architectures for applications it means that applications can be running across different networks and from different locations; (iii) on top of that, cloud technologies support features like auto scaling so that resources can be scaled out, automatically deploying new servers with no manual intervention; (iv) furthermore, the speed of cloud deployments has significantly decreased the time needed to build and deploy new applications, often referred to as running at 'cloud speed' while the need for dedicated network and security teams to configure secure network policies only add delays; (v) these requirements equate to needing real time network security configuration for the complexity, scale, and speed of cloud deployments; (vi) when applications are built, they already commonly contain x509 certificates for TLS encryption of the application data on the server; (vii) TLS is prevalent securing network communications and used by some cloud services to provide mutual authentication services between servers; (viii) certificates contain required fields that identify the server and prove its legitimacy as well as being used to establish the secure connections with other clients and servers; and (ix) digital certificates allow for optional fields to be used.

Some embodiments of the present invention may include one, or more, of the following operations, features, characteristics and/or advantages: (i) an optional field in a digital certificate includes a network allow list to be used by firewalls and networks to block connections to this server based on that information; (ii) the allow list can be trusted as being legitimate and non-tampered with because certificates require signing by a trusted authoritative server, and therefore the content of the certificate can be trusted; (iii) the content includes the entry which will be used to dynamically build firewall allow lists in the network; (iv) a field designated in a x509 digital certificate used to describe the network allow list including: (a) the protocol, (b) both source and destination ports, and (c) both source and destination address; (v) this is commonly referred to as a 5-tuple entry based on the 5 fields; (vi) network infrastructure which can read and use the certificate; (vii) it must be able to: (a) read the certificate, (b) interpret the information, (c) implement the information in the form of a network allow list, and (d) finally allow or block network connections based on these allow lists; (viii) for example, an application has two servers hosted in a Data Center or cloud; (ix) each server has its own x509 certificate for TLS; (x) included on the certificate in an extension field will be protocol and TCP/UDP port, (such as 80 or 443) and optional source address and mask as well as optional destination address and mask; (xi) when a packet is destined from server A to server B the firewall checks the certificate on the destination server before allowing it; (xii) this process dynamically builds firewall rules with no manual tasks; (xiii) this would incorporate into a standalone firewall or cloud/SDN network fabric; and (xiv) thereby generating a self-creating secure network in which the infrastructure dynamically builds allow lists and scales with cloud native and microservices architectures.

Some embodiments of the present invention may include one, or more, of the following operations, features, characteristics and/or advantages: (i) easy to incorporate into existing deployments as applications will already be using certificates regardless; (ii) developers simply follow their certificate request process and only need to add an additional field for the network allow list; (iii) no manual work is needed on network or security infrastructure to implement network and firewall access list security; (iv) network security policy follows the application in real time because the policy is built dynamically from the certificate which exists on the server, as the server moves between hosts, data centers, or clouds, the policy follows; (v) network security policy is deployed in real time with the installation of a certificate with the embedded policy; (vi) specialized network and security teams are not needed to deploy network security access lists; (vii) developers have control over implementing network security for their applications; (viii) when new servers are deployed, either manually from an administrator or by auto scaling from an automation policy, no network or firewall changes are needed because they will contain the certificate with the rules embedded for autoconfiguring the network; (ix) when servers are removed from service there is no need to close network and firewall ports and clean up stale information which can lead to unintended security vulnerabilities being exposed; (x) they are removed automatically as the server containing the certificate with the allow list embedded is removed; (xi) because certificates are generated for a specific period of time, it ensures that rules are revalidated when the certificate is reissued which is a best practice to periodically validate existing rules; (xii) since rules are embedded in the certificate, the firewall or network SDN controller only needs to trust the PKI root and intermediate certificates; and (xiii) that means it can be a public or private PKI implementation; (xiv) a certificate can optionally be placed on infrastructure including examples such as reverse proxy or load balancer or other intermediary devices as long as they are the network destination; and (xv) certificates can be issued to devices, applications or services and not constrained to traditional servers.

Some embodiments of the present invention may include one, or more, of the following operations, features, characteristics and/or advantages: (i) two examples embodiments of the present invention are illustrated below; (i) example one (shown in FIG. 4, described further below) shows the scenario protecting the network with a traditional firewall; (ii) example two (shown in FIG. 5, described further below) shows the scenario protecting the network with a cloud SDN network fabric; (iii) both examples work in the same way and reference the certificate located on the server to get the allow list information and determine if the connection is allowed or not; (iv) in either of these two examples, using the allow list provided in the diagram, if Server A has IP address 1.2.3.4 and is connecting to Server B on either port 80 or 443 it will be allowed; (v) all other traffic will be dropped by the firewall or cloud SDN network fabric; (vi) the architecture of an SDN may include a distributed hardware infrastructure with management, including access list management, taking place in a central software controller; (vii) both SDN and firewalls may use hardware or software based network interfaces; (viii) an SDN provides capabilities for a multi-tenant network architecture; (ix) the SDN network could provide certificate based rules for each individual tenant; and (x) an SDN often involves an underlay network comprising the fabric and an overlay network comprising the virtual networks and such certificate based rules could apply to both the underlay network and the overlay network.

Figure 4:
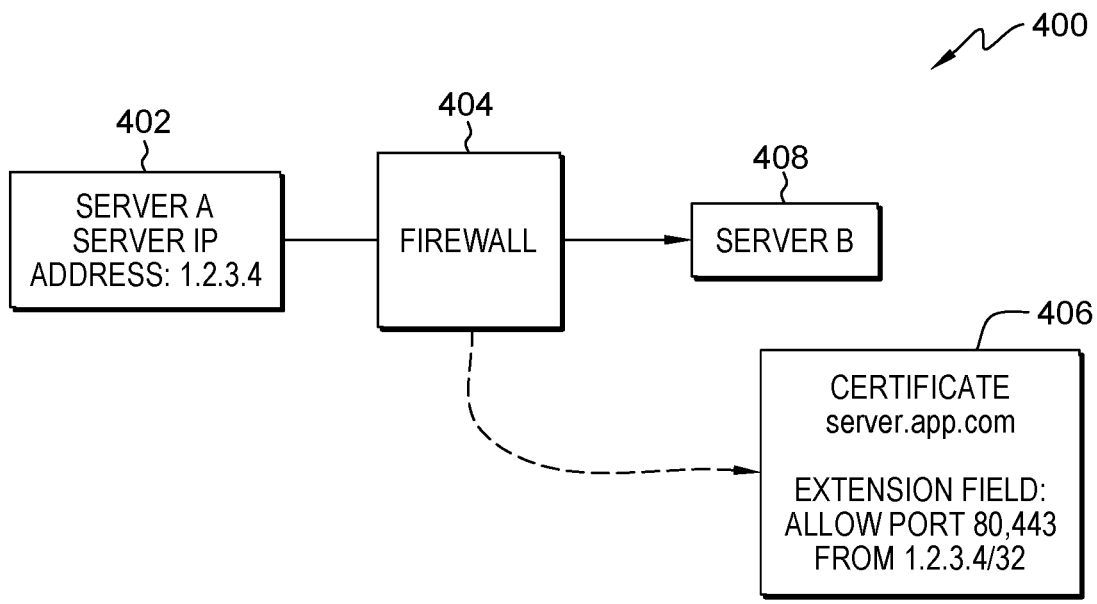
FIG. 4 is a block diagram view of a second embodiment system.

Diagram 400 of FIG. 4 is a block diagram showing an example embodiment according to the present invention, where server A 402 attempts to connect to server b 408 through firewall 404, which will allow the connection server A 402 attempts to connect through either port 80 or 443 and has an IP address of 1.2.3.4/32, as required by certificate 406, which includes the allowed connections list. When server A 402 attempts to initiate the connection to server B 408 through firewall 404, firewall 404 checks the certificate of server B 408, shown as certificate 406, for an allowed connection list including the allowed ports and incoming IP addresses. If server A has an allowed IP address and the connection attempt is through an allowed port, firewall 404 allows the connection to pass through to server B 408.

Figure 5:
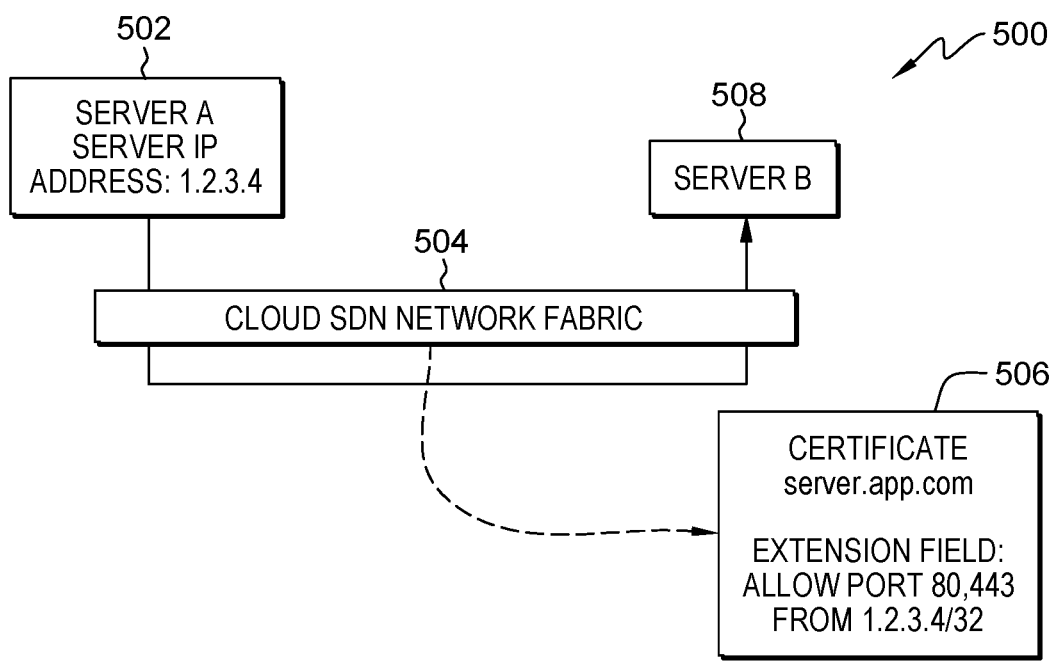
FIG. 5 is a block diagram view of a third embodiment system.

Diagram 500 of FIG. 5 is a block diagram showing another example embodiment according to the present invention, where server A 502 is attempting to connect to server B 508 through cloud SDN network fabric 504. When server A 502 attempts to initiate the connection to server B 508 through cloud SDN network fabric 504, cloud SDN network fabric 504 checks the server certificate of server B 508, shown as certificate 506, for an allowed connection list containing approved IP addresses for incoming connections and allowed ports for said connections. If server A has an allowed IP address and the connection attempt is through an allowed port, cloud SDN network fabric 504 allows the connection to pass through to server B 508.

Figure 6:
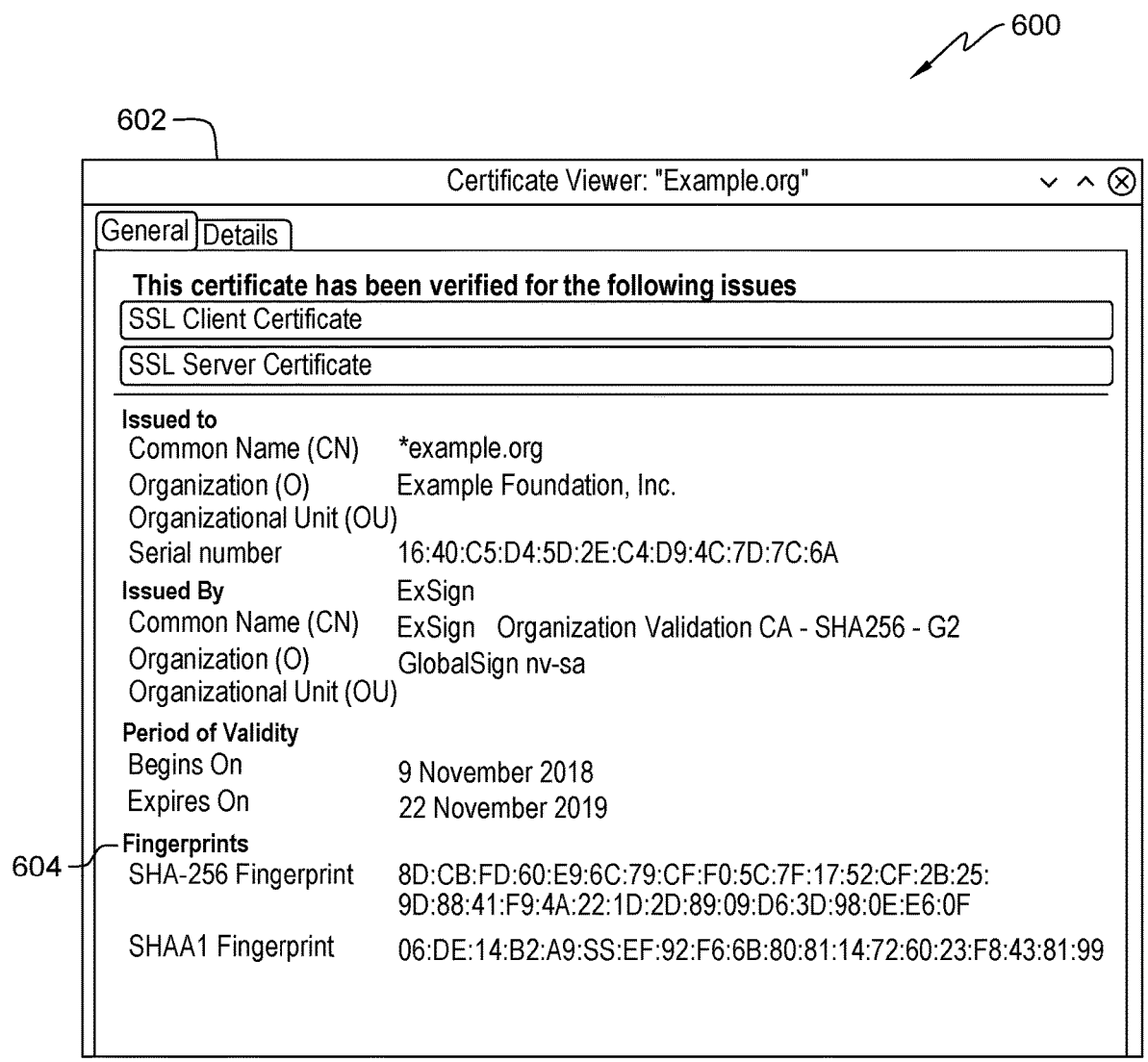
FIG. 6 is a screenshot view of an example state of the art server certificate.

Screenshot 600 of FIG. 6 shows an example of a certificate 602, showing the common fields in a certificate which is used for secure communications with a web browser and web server, including fingerprints 604.

Some embodiments of the present invention may include one, or more, of the following operations, features, characteristics and/or advantages: (i) additional extension fields are included in the certificate, creating the allow list of network traffic permitted; (ii) as an example, added under the certificate Fingerprints would include the following: Allow List: Permit TCP 80, 443 from any; (iii) this list is visible to anyone who can view the certificate but that should not be an issue since someone connecting to the certificate is already making a connection to that server over that communications channel; (iv) any private servers or services would not allow a connection and therefore those without permission would not see the certificate with the allow list; (v) a private server allow list included in a certificate may look like the following example; (vi) Allow List: (a) Permit TCP 12345 from 10.0.0.1 255.255.255.255, (b) Permit TCP 23456 to 10.1.1.1 255.2545.255.255 from 10.0.0.2 255.255.255.255; and (vii) because the source is restricted the certificate is not visible to the public, only to the infrastructure which will use the list to make the connection and the connecting devices which are included in the allow list.

Some embodiments of the present invention may include one, or more, of the following operations, features, characteristics and/or advantages: (i) use network information in certificates to block or permit network level traffic from reaching the host and determine that dynamically by using the information in the certificate; (ii) use certificates to block or permit network level traffic from reaching the host; (iii) look at the certificate issued to the device, read the network policy, and take action to block or permit network traffic by the policy listed in the certificate; (iv) this is done completely in the process of making the connection and no administration of the firewall is required; (v) does not require a valid client certificate and no authentication takes place with the client; (vi) only the server certificate is needed, and issuing server certificates is common in current server deployments; (vii) the server's certificate must be valid and the signing server of the certificate must be trusted by the infrastructure and follow normal PKI process; (viii) does not use client certificates and does not use routing to provide security; (ix) instead, using access control lists which are the current standard method of firewalls restricting network access; (x) the creation and distribution of policy information as access control lists embedded in certificates in an extension field which resides on the servers themselves; (xi) and using network devices, either physical or virtual, including SDN fabrics to read and interpret the certificate to either allow or deny data packets from the client to server; (xii) keeping the policy creation and enforcement centralized and within the management of the provider and does not rely on any client, client authentication, client certificate, nor client data; (xiii) using digital certificates and makes no distinction on the process to create or sign such digital certificates; (xiv) implementation of such signing is not relevant to the function of some embodiments; and (xv) the use of the final created certificate with a certificate extension for the access control list is relevant as it will contain the distributed policy for the invention network capability to allow or deny data packets based on that policy content.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

In an Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, and application-specific integrated circuit (ASIC) based devices.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

We: this document may use the word "we," and this should be generally be understood, in most instances, as a pronoun style usage representing "machine logic of a computer system," or the like; for example, "we processed the data" should be understood, unless context indicates otherwise, as "machine logic of a computer system processed the data"; unless context affirmatively indicates otherwise, "we," as used herein, is typically not a reference to any specific human individuals or, indeed, and human individuals at all (but rather a computer system).

What is claimed is:

1. A computer-implemented method (CIM) comprising:
   receiving, by a network security computer, an incoming unit of data originating from an originating computer device for communication over a computer network to a destination computer device, including at least one network destination;
   receiving, by the network security computer, a server network security certificate from the destination computer device, where the server network security certificate includes information indicative of allowed network connections;
   determining, by the network security computer, whether the incoming unit of data is approved for forwarding to the destination computer device based, at least in part, on the network allow list field and the at least one network destination of the incoming unit of data; and
   forwarding, by the network security computer, the incoming unit of data from the originating computer device to the destination computer device.

2. The CIM of claim 1, wherein the server network security certificate is a TLS x509 certificate.

3. The CIM of claim 1, wherein the information indicative of allowed network connections includes a network allow field designated in the server network security certificate, with the field including at least: (a) at least one protocol type, and (b) at least one destination.

4. The CIM of claim 3, wherein the network allow field further includes at least one of the following entries: (a) at least one source protocol type, (b) at least one source, and (c) at least one destination.

5. The CIM of claim 3, wherein determining whether the incoming unit of data is approved for forwarding to the destination computer device includes comparing any part or combination of port, protocol, or destination requested by the incoming unit of data to the at least one destination.

6. The CIM of claim 1, further comprising:
   receiving a second incoming unit of data originating from a second originating computer device for communication over the computer network to the destination computer device, including at least one destination;
   determining whether the second incoming unit of data is approved for forwarding to the destination computer device based, at least in part, on the network allow list field and the at least one destination of the second incoming unit of data; and
   blocking the second incoming unit of data from being sent from the second originating computer device to the destination computer device.

7. A computer program product (CPP) comprising:
   a machine readable storage device; and
   computer code stored on the machine readable storage device, with the computer code including instructions for causing a processor(s) set to perform operations including the following:
   receiving, by a network security computer, an incoming unit of data originating from an originating computer device for communication over a computer network to a destination computer device, including at least one network destination,
   receiving, by the network security computer, a server network security certificate from the destination computer device, where the server network security certificate includes information indicative of allowed network connections,
   determining, by the network security computer, whether the incoming unit of data is approved for forwarding to the destination computer device based, at least in part, on the network allow list field and the at least one network destination of the incoming unit of data, and
   forwarding, by the network security computer, the incoming unit of data from the originating computer device to the destination computer device.

8. The CPP of claim 7, wherein the server network security certificate is a TLS x509 certificate.

9. The CPP of claim 7, wherein the information indicative of allowed network connections includes a network allow field designated in the server network security certificate, with the field including at least: (a) at least one protocol type, and (b) at least one destination.

10. The CPP of claim 9, wherein the network allow field further includes at least one of the following entries: (a) at least one source protocol type, (b) at least one source, and (c) at least one destination.

11. The CPP of claim 9, wherein determining whether the incoming unit of data is approved for forwarding to the destination computer device includes comparing any part or combination of port, protocol, or destination requested by the incoming unit of data to the at least one destination.

12. The CPP of claim 7, wherein the computer code further includes instructions for causing the processor(s) set to perform the following operations:
   receiving a second incoming unit of data originating from a second originating computer device for communication over the computer network to the destination computer device, including at least one destination;
   determining whether the second incoming unit of data is approved for forwarding to the destination computer device based, at least in part, on the network allow list field and the at least one destination of the second incoming unit of data; and
   blocking the second incoming unit of data from being sent from the second originating computer device to the destination computer device.

13. A computer system (CS) comprising:
   a processor(s) set;
   a machine readable storage device; and
   computer code stored on the machine readable storage device, with the computer code including instructions for causing the processor(s) set to perform operations including the following:
   receiving, by a network security computer, an incoming unit of data originating from an originating computer device for communication over a computer network to a destination computer device, including at least one network destination, receiving, by the network security computer, a server network security certificate from the destination computer device, where the server network security certificate includes information indicative of allowed network connections, determining, by the network security computer, whether the incoming unit of data is approved for forwarding to the destination computer device based, at least in part, on the network allow list field and the at least one network destination of the incoming unit of data, and forwarding, by the network security computer, the incoming unit of data from the originating computer device to the destination computer device.

14. The CS of claim 13, wherein the server network security certificate is a TLS x509 certificate.

15. The CS of claim 13, wherein the information indicative of allowed network connections includes a network allow field designated in the server network security certificate, with the field including at least: (a) at least one protocol type, and (b) at least one destination.

16. The CS of claim 15, wherein the network allow field further includes at least one of the following entries: (a) at least one source protocol type, (b) at least one source, and (c) at least one destination.

17. The CS of claim 15, wherein determining whether the incoming unit of data is approved for forwarding to the destination computer device includes comparing any part or combination of port, protocol, or destination requested by the incoming unit of data to the at least one destination.

18. The CS of claim 13, wherein the computer code further includes instructions for causing the processor(s) set to perform the following operations:

receiving a second incoming unit of data originating from a second originating computer device for communication over the computer network to the destination computer device, including at least one destination;

determining whether the second incoming unit of data is approved for forwarding to the destination computer device based, at least in part, on the network allow list field and the at least one destination of the second incoming unit of data; and blocking the second incoming unit of data from being sent from the second originating computer device to the destination computer device.

* * * * *